United States Patent
Feinberg

(10) Patent No.: US 9,291,808 B2
(45) Date of Patent: Mar. 22, 2016

(54) COMBINATION OPTICAL AIMING DEVICE FOR PROJECTILE WEAPONS

(71) Applicant: Leupold & Stevens, Inc., Beaverton, OR (US)

(72) Inventor: Richard Feinberg, Redmond, WA (US)

(73) Assignee: Leupold & Stevens, Inc., Beaverton, OR (US)

(*) Notice: Subject to any disclaimer, the term of this patent is extended or adjusted under 35 U.S.C. 154(b) by 305 days.

(21) Appl. No.: 13/838,395

(22) Filed: Mar. 15, 2013

(65) Prior Publication Data

US 2014/0268323 A1 Sep. 18, 2014

(51) Int. Cl.
*G02B 23/00* (2006.01)
*G02B 23/14* (2006.01)
*F41G 1/38* (2006.01)

(52) U.S. Cl.
CPC ...... *G02B 23/00* (2013.01); *F41G 1/38* (2013.01); *G02B 23/14* (2013.01); *Y10T 29/49826* (2015.01)

(58) Field of Classification Search
CPC ...... G02B 23/00–23/04; G02B 23/08–23/105; G02B 15/00; G02B 21/025; F41G 1/38; F41G 1/40
See application file for complete search history.

(56) References Cited

U.S. PATENT DOCUMENTS

| | | | |
|---|---|---|---|
| 2,388,673 A | 11/1945 | Brown | |
| 2,512,153 A | 6/1950 | Henyey et al. | |
| 2,527,719 A | 10/1950 | Greenstein et al. | |
| 5,161,051 A | 11/1992 | Whitney et al. | |
| 5,349,469 A | 9/1994 | Francis | |
| 5,652,679 A | 7/1997 | Freeman | |
| 6,327,806 B1 | 12/2001 | Paige | |
| 6,487,809 B1 | 12/2002 | Gaber | |
| 7,522,356 B1 * | 4/2009 | Whitty | 359/811 |
| 2004/0075894 A1 * | 4/2004 | Shafer et al. | 359/365 |
| 2011/0199677 A1 * | 8/2011 | Schick et al. | 359/428 |
| 2011/0232152 A1 | 9/2011 | Thomas et al. | |

FOREIGN PATENT DOCUMENTS

CA 670887 A 9/1963

* cited by examiner

*Primary Examiner* — James Greece
*Assistant Examiner* — Sharrief Broome
(74) *Attorney, Agent, or Firm* — Stoel Rives LLP

(57) ABSTRACT

A combination optical aiming device comprises a non-magnifying sight that includes an optic and a magnifying sight that includes an eyepiece and an objective. To reduce the vertical distance between viewing positions for the sights, the optic and the eye lens are truncated in order to position the optic predominately outside of a projection of a perimeter of the eye lens, the projection being parallel to the optical axis of the objective.

26 Claims, 3 Drawing Sheets

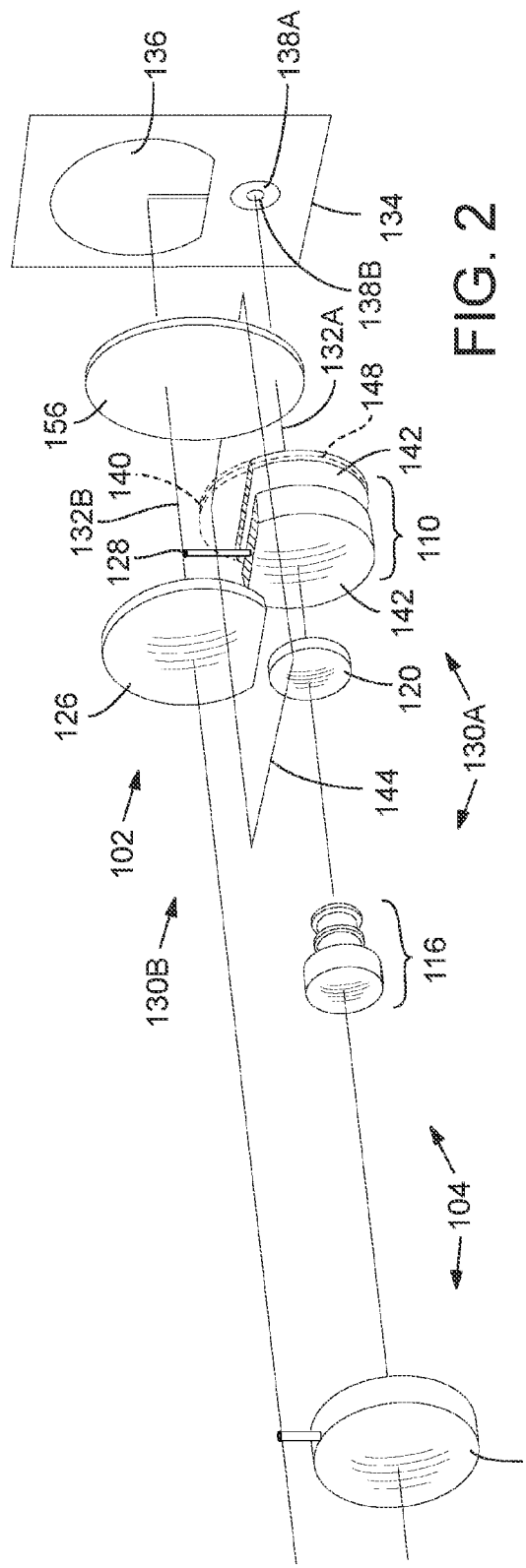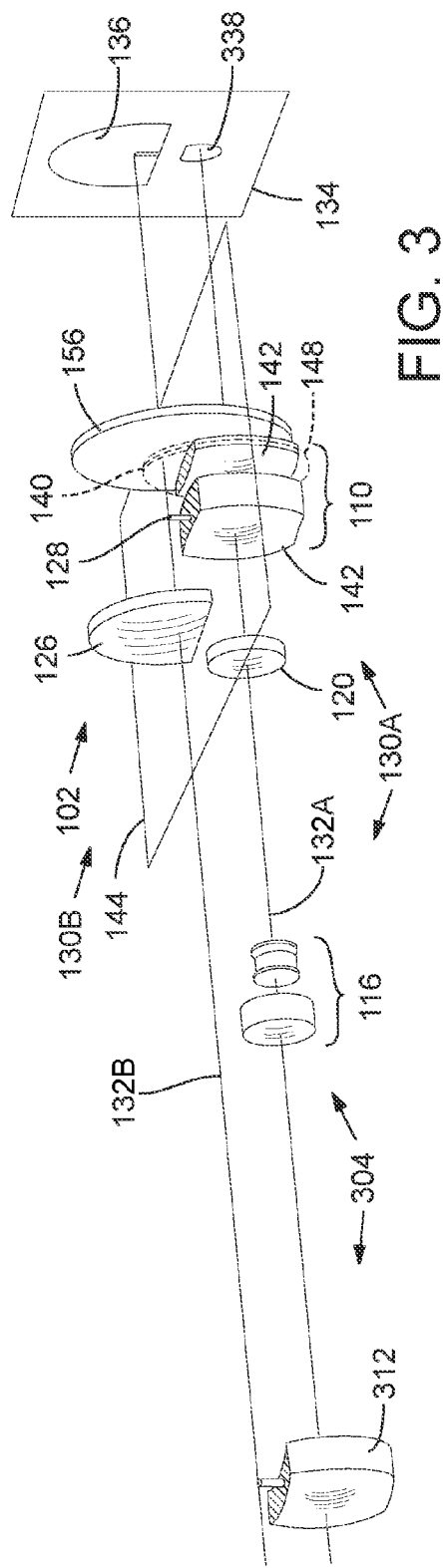

COMBINATION OPTICAL AIMING DEVICE FOR PROJECTILE WEAPONS

BACKGROUND

Telescopic sights, such as rifle scopes, optically magnify distant objects but only provide a narrow field of view. While a distant object may be easier to resolve with a telescopic sight, the narrow field of view may make it difficult to track movement of the object. At close ranges, it is sometimes preferable to provide an alternative aiming point to one eye using a sight having no additional magnification in order to match a view seen by the other, naked eye. In an effort to provide an enlarged view and a view with a wider field of view without swapping scopes, a reflex sight is often mounted to a telescopic sight, so that a user may choose which sight to use when viewing an object according to the circumstances. While such approaches may avoid removing and replacing one scope with another, the inventor has recognized that the head and/or weapon movement required for a user to switch from one sight to another may lead to loss of aim and delay in targeting.

BRIEF DESCRIPTION OF THE DRAWINGS

FIG. 2 shows a perspective view of example simplified optical systems included in an embodiment of a combination optical aiming device according to the present disclosure.

FIG. 3 shows a perspective view of example simplified optical systems included in another embodiment of a combination optical aiming device according to the present disclosure.

DETAILED DESCRIPTION OF PREFERRED EMBODIMENTS

Figure 1:
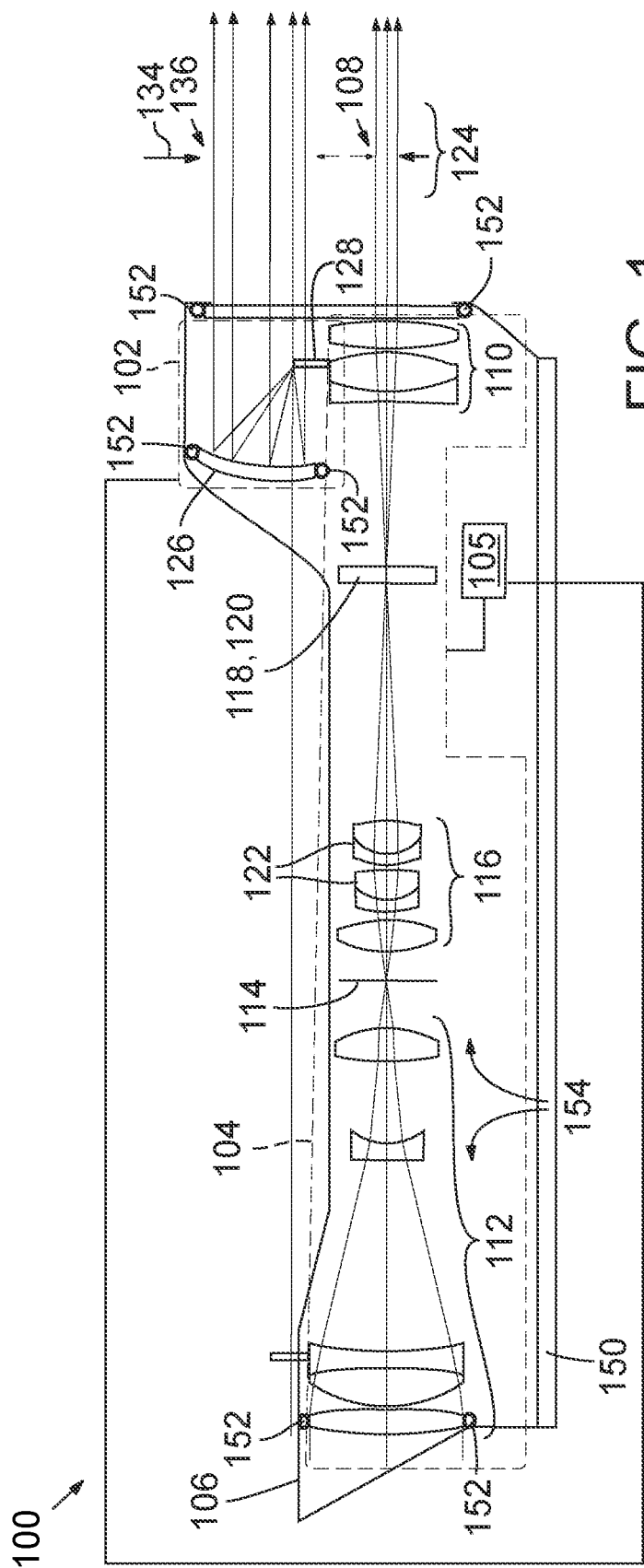
FIG. 1 schematically shows a side cross-section view of an embodiment of a combination optical aiming device including examples of a magnifying sight and a non-magnifying optical sight according to the present disclosure.

FIG. 1 schematically shows a side cross-section of a combination optical aiming device 100 (depicted as a riflescope in FIG. 1, though in some embodiments combination optical aiming device 100 may be included in a spotting scope or an archery scope) according to an embodiment of the present disclosure. Combination optical aiming device 100 includes a non-magnifying sight 102 and a magnifying sight 104 for viewing differently magnified images of a distant object from a common viewing plane or position. In the embodiment shown in FIG. 1, non-magnifying sight 102 and magnifying sight 104 are shown mounted within a common housing 106.

Magnifying sight 104 is a telescope that allows a user to view a magnified, or enlarged, image of a distant object at an eyepoint 108. The image is viewable via an exit pupil at a location behind the sight, preferably at eyepoint 108. Magnifying sight 104 includes an eyepiece 110 that may include one or more eye lenses. Magnifying sight 104 also includes an objective 112 that may include one or more objective lenses and/or reflectors. Eyepiece 110 and objective 112 are positioned at opposite ends of the sight in the example shown in FIG. 1. Typically, objective 112 gathers light from the distant object and produces an inverted image of the object at front focal plane 114, positioned behind objective 112. An erector system 116 rectifies the inverted image, producing an erect image of the object at a rear focal plane 118 positioned behind front focal plane 114 and erector system 116. Erector system 116 may include one or more lenses or other optical elements (e.g., reflectors and/or prisms) used to produce the erect image. A reticle 120 is shown in FIG. 1 at rear focal plane 118, though in some embodiments reticle 120 may be positioned or located at front focal plane 114.

In the embodiment shown in FIG. 1, moveable lens elements 122 of erector system 116 adjust the optical power of magnifying sight 104. In some embodiments, optical power may be adjusted by rotating a power selector ring (not shown) or other drive mechanism to drive moveable lens elements 122 along an optical axis, or optical centerline, to adjust image magnification of magnifying sight 104 as perceived by a user viewing the erect image through eyepiece 110.

In use, the distant object is visible via magnifying sight 104 within an eyebox 124. That is, eyebox 124 defines a region behind magnifying sight 104 in which the distant object is viewable with the sight. The radial size and shape of eyebox 124, extending from an optical axis of eyepiece 110, and the depth of the eyebox 124 (a front-to-back depth shown in brackets in FIG. 1) are governed by a combination of the size and shape of the bundle of off-axis rays forming the exit pupil and the eye relief of magnifying sight 104. Accordingly, the distant object will be viewable via magnifying sight 104 if a viewing plane intersects eye box 124. Aligning the pupil of the viewer's eye with eye box 124 would be expected to prevent vignetting when viewing the distant object.

While a magnified view of the distant object may ease aiming in some settings (e.g., where the object is too far away to be easily resolved without magnification), the viewer's depth perception may be altered by the telescopic view, or the sharpness of close targets may be degraded. This may make it difficult to maintain proper eye relief or target aim point when sighting on a moving target. In contrast, non-magnifying sight 102 may be used at almost any distance from the eye without interfering with the viewer's depth perception or perceived sharpness of the target.

Non-magnifying sight 102 is an optical device that allows a user to view an image of an aiming point superimposed on a field of view of non-magnifying sight 102 in the far field via an optic 126. For ease of illustration, the examples of non-magnifying sight 102 described herein generally relate to reflex sights. Nevertheless, it will be appreciated that some embodiments of combination optical aiming device 100 may include a holographic sight that allows a user to look through optic 126 and view an aiming point (e.g., a holographic reticle image) illuminated by an aiming light source (e.g., a laser) and superimposed on a distant object in the far field. In contrast, reflex sights often position a source for the aiming point, such as an illuminated "dot" or reticle, at or near a focal point of a partially reflective optic that transmits some light received from the distant object and reflects some light received from the source. In the embodiment shown in FIG. 1, optic 126 is illustrated as a curved mirror, though in some other embodiments, optic 126 may include a flat reflector used with a collimated light source. The embodiment shown in FIG. 1 also shows aiming light source 128 mounted on a support structure. In some embodiments, the support structure may be shaped as a thin post or blade-like structure. Non-limiting examples of such support structures may have cross-sectional profiles having a thickness of about 1 mm and a width of about 5 mm. Of course, it will be appreciated that the height of such support structures may vary in order to position aiming light source 128 primarily at an optical axis of optic 126.

The example non-magnifying sight 102 shown in FIG. 1 illustrates a reflex sight in which optic 126 collimates light received from aiming light source 128. Aiming light source 128 may include a light-emitting diode (LED) (e.g., a chip-mounted LED in some embodiments) or any other suitable light source. Because aiming light source 128 is positioned at, or slightly closer than the focal point of optic 126, a virtual image of aiming light source 128 will appear, to the viewer, as if positioned at a desired range in the far field.

While some previous scopes have attempted to mount a non-magnifying sight to a telescopic sight, the physical size of many conventional telescopic sights and non-magnifying sights often requires the user to make undesirably large head movements (e.g., 25 mm or more) when switching between them. If mounted to a projectile weapon, such as a rifle, the movement may cause the user to lose contact, sometimes referred to as "cheek weld," between the user's cheek and the stock of the weapon. Loss of cheek weld may lead to loss of aim and delay in targeting when firing a weapon with substantial recoil.

Accordingly, the embodiments disclosed herein include combination optical aiming devices for viewing differently magnified images of a distant object and methods for manufacturing the same. As explained in more detail below, one or more of optic 126 and one or more eye lens elements included in eyepiece 110 may be shaped so that non-magnifying sight 102 and magnifying sight 104 may be positioned closer to one another than the conventionally mounted sights described above. Put another way, optic 126 and eyepiece 110 are selectively positioned within combination optical aiming device 100 to reduce the spacing between those sights (that is, to reduce a "dead zone" separating the sights from one another, which may be occupied by housing and hardware elements) while generally maintaining segregation between light transmitted by each sight. This potentially may reduce user head movement when switching between non-magnifying sight 102 and magnifying sight 104.

FIG. 2 shows a perspective view of simplified optical systems (shown as 130A and 130B) for magnifying sight 104 and non-magnifying sight 102, respectively, as positioned within combination optical aiming device 100. For ease of illustration, FIG. 2 shows a single common viewing plane 134, though it will be understood that a plurality of common viewing planes 134 may intersect eye box 124 (FIG. 1).

Optical axis 132A of eyepiece 110 and optical axis 132B of optic 126 extend rearwardly toward common viewing plane 134. In the embodiment shown in FIG. 2, optical axis 132A is aligned with optical axes of other optical elements within magnifying sight 104 (e.g., objective 112), and is parallel with optical axis 132B of optic 126, within an acceptable tolerance. Alternatively, in some embodiments, one or more portions of the optical system for either or both sights forward of optic 126 or eyepiece 110 may be aligned in different directions from optical axes 132B and 132A, respectively. For example, in some of such embodiments, portions of non-magnifying sight 102 and/or magnifying sight 104 may include folded optical paths and/or optical paths skewed with one another forward of optic 126 and eyepiece 110, respectively.

Objective 112 may act as the aperture stop, and only light passing through objective 112 exits optical system 130A via eyepiece 110. Alternatively, usually at low magnification settings of a zoom erector system, an internal aperture inside the zoom erector system may act as the aperture stop. Because an exit pupil of a telescopic system is an image of an aperture stop of that system as seen from the eye side of that system, the exit pupil governs a radial extent of allowable eye pupil placement from which object light is visible at the eyepoint. As introduced above, the exit pupil effectively defines a radial size and shape of the longitudinal center of eyebox 124 along the magnified sight axis. In the context of magnifying sight 104, the exit pupil generally corresponds to an image of objective 112 as viewed from behind eyepiece 110, or of an image of an aperture within the erector at low power. While the exit pupil is shaped according to the shape of objective 112, or of the internal aperture of erector system 116, the exit pupil is sized according to the magnifying power of magnifying sight 104. In the embodiment shown in FIG. 2, two alternative exit pupils (shown as larger exit pupil 138A and smaller exit pupil 138B) are depicted within common viewing plane 134. Generally, the diameter of the smaller exit pupil is given by dividing the diameter of the objective lens by the optical power of the optical system at high power. In the embodiment shown in FIG. 2, larger exit pupil 138A corresponds to a lower optical power setting for magnifying sight 104 while smaller exit pupil 138B corresponds to a higher optical power setting. Regardless of the power setting, in some embodiments, both exit pupils may remain spaced apart from viewing zone 136 for the non-magnified sight within common viewing plane 134. In such embodiments, the image light delivered to viewing zone 136 remains segregated from the light delivered to the exit pupil, providing discrete and distinct images from each sight.

Viewing zone 136 corresponds to the area within common viewing plane 134 from which a viewer is able to observe the image of the aiming point using non-magnifying sight 102. In the example shown in FIG. 2, an image of aiming light source 128 would be expected to be viewable from within viewing zone 136. Conceptually, viewing zone 136 represents the "effective" exit pupil of non-magnifying sight 104, so that viewing zone 136 has the same geometrical shape as a projection of optic 126 on common viewing plane 134, minus a thin shadow created by the support structure of aiming light source 128. As introduced above, one or more of optic 126 and one or more eye lenses included in eyepiece 110 may be shaped so that optical axes 132A and 132B may be positioned closer to one another than in a conventional sight. As shown in FIG. 2, this proximity may be achieved in some embodiments by selectively removing portions (one of which is shown in phantom as a circular segment 140) of circular lenses to form a plurality of eye lenses 142. The shape of eye lenses 142 is constructed using a horizontal reference plane 144 that is parallel with the optical axis of the objective and a reference circle 148 centered about the optical axis of eyepiece 110.

Horizontal reference plane 144 is tangent to a base 146 of optic 126, where base 146 refers to a bottom edge of optic 126 that positions horizontal reference plane 144 nearest to the optical axis of the objective and/or the eyepiece. Stated differently, an edge of optic 126 nearest the optical axis of the objective and/or the eyepiece is positioned tangent to horizontal reference plane 144. In turn, horizontal reference plane 144 intersects a reference circle 148 centered about the optical axis of the objective. In the embodiment shown in FIG. 2, horizontal reference plane 144 is shown parallel with optical axis 132A, which is coaxial with the optical axis of objective 112.

For a particular eye lens 142, a reference circle 148 centered on the optical axis of that eye lens 142 surrounds that eye lens 142 and touches at least one edge of that eye lens 142. That is, a reference circle 148 for a particular eye lens 142 is coterminous with at least a portion of that particular eye lens 142. For each shaped eye lens 142, reference circle 148 surrounds eye lens 142, is centered about the optical axis of eye lens 142, and touches at least one edge of eye lens 142, so that reference circle 148 is coterminous with at least a portion of eye lens 142.

The intersection of reference circle 148 and horizontal reference plane 144 defines a circular segment of circle 148. In some embodiments, when overlaid on a circular lens, the circular segment may define dimensions for circular segment 140 so that, when circular segment 140 is removed, a truncated circular eye lens remains. For example, approximately an upper one-fourth of one or more eye lenses 142 having diameters in a range of 25 to 40 mm in eyepiece 110 may be removed in some embodiments. In some other embodiments, the remaining portion of reference circle 148 (that is, circle 148 less the circular segment) defines a shape that may be used to mold, cast, grind, or cut a truncated circular eye lens.

Each eye lens 142 included in eyepiece 110 of the embodiment shown in FIG. 2 is shaped accordingly, though it will be appreciated that circular segments of different sizes may be removed from one or more eye lenses 142 in some embodiments. For example, in an embodiment where optical axis 132A is angled toward optical axis 132B (e.g., at an upward angle), an eye lens located closer to optical axis 132B may be truncated to a greater extent than another eye lens positioned farther from optical axis 132B.

One consequence of the shaping of one or more eye lenses 142 (or in addition or in the alternative, in some embodiments, the shaping of optic 126) is that optic 126 is predominately or primarily positioned outside of a projection of a perimeter of a particular eye lens 142 along an axis parallel to the optical axis of objective lens 112. In turn, light transmitted by optic 126 is not obstructed or altered by light transmitted by magnifying sight 104. Put another way, light from aiming light source 128 is not visible from eyepoint 108.

Truncating eyepiece 110 has no effect on the size or shape of the exit pupil of magnifying sight 104. However, truncating one or more eye lenses in eyepiece 110 may alter the field of view (e.g., by removal thereof) as seen through magnifying sight 104. Accordingly, in some embodiments, a portion of optic 126 may be removed during fabrication as an alternative to truncation of one or more eye lenses to avoid altering the eyepiece field of view. For example, approximately one-eighth or more of a circularly shaped partially reflective mirror (for a reflex sight) having a diameter in a range of 30 to 60 mm, or circularly shaped flat glass (for a holographic sight) having a diameter in a range of 30 to 60 mm, may be truncated to form a flat-based optic like that shown in FIG. 2. In addition, if truncation of the optic is combined with truncation of eyepiece 110, even closer spacing of non-magnifying sight 102 and magnifying sight 104 may be realized in some embodiments.

Additionally or alternatively, in some embodiments, one or more lenses or optical elements included in objective 112 may be truncated. Truncating optical elements within objective 112 may allow magnifying sight 304 and non-magnifying sight 102 to be spaced closer together relative to the embodiment shown in FIG. 2, though truncation of the objective may alter the shape of the exit pupil, particularly at the higher power settings. Because the exit pupil 338 is a conjugate image of the entrance pupil, exit pupil 338 exhibits a truncated shape if the truncation zone impinges on the entrance pupil diameter at a particular magnification. In some embodiments, up to about one-fourth of one or more circularly shaped objective lenses having diameters in a range of 20 to 60 mm may be removed to form truncated objective 312. For example, FIG. 3 shows a perspective view of simplified optical systems for a combination optical aiming device 100 including a magnifying sight 104 and a non-magnifying sight 102. In the example shown in FIG. 3, magnifying sight 104 includes a truncated objective 312 including one or more truncated objective lenses.

Combination optical aiming devices according to the present disclosure are not limited to those having truncated circular optical elements, nor is the fabrication thereof limited to the removal of circular segments from circular lenses. In some embodiments, eyepiece 110 and optic 126 may have complementary shapes so that projections of eyepiece 110 and optic 126 in a plane normal to either one or both of optical axes 132A and 132B do not overlap one another. For example, a circularly shaped region may be removed from a portion of an optic to permit placement of a circularly shaped eye lens therein. In another example, more than one circular segment may be removed from a circular lens to form an eye lens that is truncated on more than one edge. In yet another example, non-circular regions may be removed from respective starting pieces for the eye lens and optic so that the finished optical elements have complementary shapes.

Turning back to FIG. 1, combination optical aiming device 100 includes a housing 106 having a mounting surface 150 that facilitates mounting the scope to a projectile weapon, to a tripod, or to any other suitable support surface (not shown). For example, mounting surface 150 may be mounted to a projectile weapon so that magnifying sight 104 and/or non-magnifying sight 102 are aligned with a line of initial trajectory of the projectile weapon. Housing 106 also includes an internal adjustment mechanism 105 used to adjust non-magnifying sight 102 and/or magnifying sight 104 relative to one another. For example, internal adjustment mechanism 105 may be configured to adjust a vertical and/or a horizontal alignment of non-magnifying sight 102 relative to an alignment of magnifying sight 104 before or after combination optical aiming device 100 is mounted to a projectile weapon.

Housing 106 supports and encloses optical systems 130A and 130B. In the embodiment shown in FIG. 1, gaskets 152 included in housing 106 provide a weathertight environment 154 (which may also be water-free) within combination optical aiming device 100, so that optical elements, optical drives, and various support surfaces included within housing 106 may be protected from ambient conditions and/or condensation.

In some embodiments, sealing window 156 may include a flat, optically transmissive surface 158 through which optical axes 132A and 132B pass, respectively, en route to common viewing plane 134. In such embodiments, sealing window 156 forms a unified viewing interface for both sights, presenting the user with a viewing window that may be easier to clean and maintain and potentially more engaging than some conventionally separated scopes.

Figure 4:
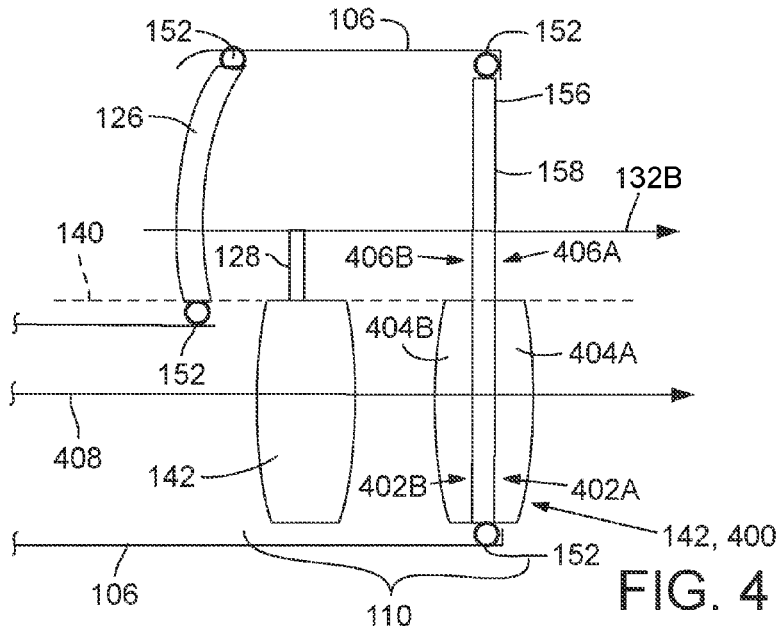
FIG. 4 schematically shows a side cross-section view of an example eye lens integrated with a sealing window according to an embodiment of the present disclosure.

In some embodiments, optically transmissive surface 158 may have a plano-convex lens positioned on either side thereof, effectively integrating a final eye lens of eyepiece 110 with sealing window 156. Integrating the final eye lens with sealing window 156 may contribute to a sealed environment formed within housing 106 while eliminating an additional optical element in the optical path of magnifying sight 104. For example, FIG. 4 schematically shows a side cross-section view of an embodiment of an integrated eye lens 400 in simplified form. As shown in FIG. 4, a flat surface 402A of one plano-convex lens 404A is optically bonded (e.g., using an index-matching adhesive) on a first, ambient, exterior side 406A of optically transmissive surface 158, and a flat surface 402B of another plano-convex lens 404B is optically bonded to a second, interior side 406B opposite plano-convex lens 404A. In such an embodiment, an optical axis of each plano-convex lens is positioned in optical alignment with an incoming optical path of magnifying sight 104. In the example shown in FIG. 4, plano-convex lenses 404A and 404B share a common optical axis 408 that is aligned with optical axis 132A of magnifying sight 104.

Figure 5:
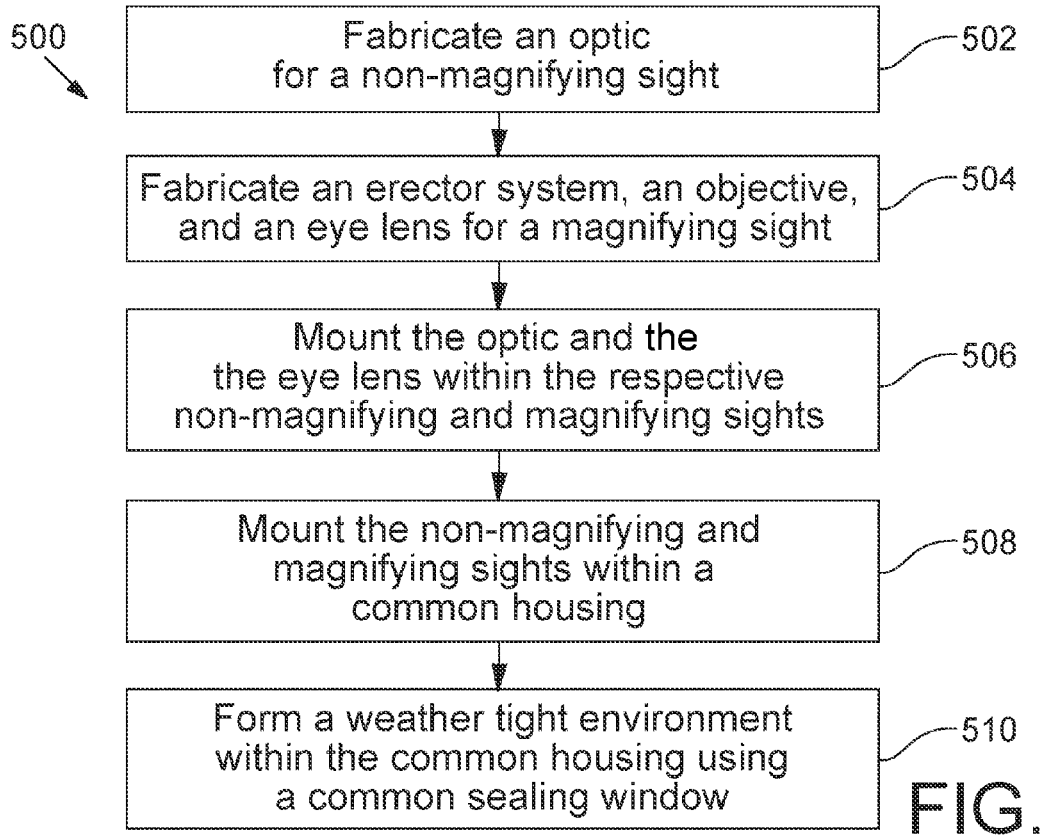
FIG. 5 is a flowchart for an embodiment of a method of manufacturing a combination optical aiming device according to the present disclosure.

Embodiments of combination optical aiming device 100, such as those shown in FIGS. 1-4, are suitable for use with projectile weapons (e.g., a bow, a rifle, a sidearm, etc.), and as a standalone scope (e.g., for use as a spotting scope). Naturally, application-based variation may lead to some variation in form factor and/or manufacture, but it will be appreciated that embodiments of combination optical aiming device 100 may be manufactured in any suitable fashion. For example, FIG. 5 is a flowchart illustrating an embodiment of a method 500 for manufacturing or fabricating a combination optical aiming device, such as embodiments of combination optical aiming device 100 described herein. It will be appreciated that the embodiment of method 500 shown in FIG. 5 is provided for illustrative purposes only. In some embodiments, method 500 may be supplemented with a process not shown in FIG. 5, and/or one or more of the processes shown in FIG. 5 may be rearranged or omitted without departing from the scope of the present disclosure.

At 502, method 500 includes fabricating an optic for a non-magnifying sight, and, at 504, fabricating an erector system, an objective, and an eye lens for a magnifying sight. In some embodiments, fabricating the optic at 502 and/or fabricating the eye lens at 504 may include reshaping an optical structure into the optic and/or the eye lens, respectively. In such embodiments, either one or both of the optic and the eye lens may be reshaped, so that, when mounted in the combination optical aiming device, the optic has a base that is both tangent to a base of the optic and parallel to an optical axis of the objective intersects a circle that surrounds the eye lens, touches at least one edge of the eye lens, and is centered about an optical axis of the eye lens, and the optic is positioned predominately outside of a projection of a perimeter of the eye lens parallel to the optical axis of the objective lens.

In some embodiments, reshaping an optical structure may include reshaping the optical structure so that either one or both of the optic and the eye lens has a shape that complements the other. For example, a circular section may be removed from a circular lens, forming a truncated circular eye lens, a flat surface of which complements a flat base of the optic. In another example, a circular piece of flat glass used in a holographic sight or a circularly shaped partially reflective mirror used in a reflex sight may be trimmed to have a shape complementary to the eye lens (e.g., by removing a circularly shaped portion of the glass or mirror that complements a circular eye lens, or by removing a circular section of the glass or mirror to form a truncated circular optic that complements a truncated circular eye lens).

In some embodiments, fabricating the eye lens at 504 may include optically bonding a first plano-convex lens (e.g., using an index-matching adhesive) on a first, ambient, exterior side of an optically transmissive surface of a sealing window and optically bonding a flat surface of a second plano-convex lens to a second, interior side of the optically transmissive surface of the sealing window opposite the first plano-convex lens so that an optical axis of each plano-convex lens is positioned in optical alignment with an incoming optical path of the magnifying sight.

At 506, method 500 includes mounting the optic and the eye lens within the respective non-magnifying and magnifying sights so that a horizontal plane that is both tangent to a base of the optic and parallel to an optical axis of the eye lens intersects a circle that surrounds the eye lens, touches at least one edge of the eye lens, and is centered about the optical axis.

At 508, method 500 includes mounting the non-magnifying and magnifying sights within a common housing. Finally, method 500 concludes at 510, forming a weathertight environment within the housing using a common sealing window through which optical axes of both the non-magnifying and magnifying sights pass en route to the common viewing plane.

Example

In one non-limiting prophetic example, an embodiment of combination optical aiming device 100 includes a non-magnifying reflex sight having an optical center line positioned about 25 mm above an optical axis of a 2.5-8×32 mm telescopic sight. In this example, the reflex sight is formed starting with a 40 mm diameter glass partially reflective mirror that is trimmed to form an optic having approximately 20 mm of glass above its optical axis and approximately 15 mm of glass below its optical axis. That is, a 5 mm high circular segment of glass is removed from the bottom of the optic during shaping. Because the optical axis of the optic is positioned about 25 mm above from the optical axis of the eye piece, the bottom of the optic is positioned approximately 10 mm above the optical axis of the eye lens. In turn, the bottom of the viewing zone of the optic is also about 15 mm below the optical axis of the optic and about 10 mm above the optical axis of the telescopic sight.

The telescopic sight in this example includes an eye lens that is formed starting with a circularly shaped glass lens having a diameter of approximately 30 mm that is trimmed to have approximately 10 mm of glass above its optical axis and approximately 15 of glass below its optical axis, so that a 5 mm high circular segment of glass is removed from the top of the circular lens during shaping. Because the optical axis of the eye lens is positioned about 25 mm below the optical axis of the optic, the top of the eye lens is positioned approximately 15 mm below the optical axis of the optic. Moreover, if optical axes for the unshaped, or untrimmed, mirror and lens were positioned about 25 mm apart, diameters of those optical pieces would overlap one another by about 10 mm.

At low power (2.5× magnification), the exit pupil of the telescopic sight has an exit pupil that is about 10.8 mm in diameter and centered on the optical axis of the telescopic sight. Accordingly, the top of the exit pupil is about 4.6 mm below the bottom of the viewing zone of the optic (i.e., (10 mm separation between the bottom of the viewing zone and the optical axis of the telescopic sight)−0.5× (10.8 mm telescopic sight exit pupil diameter at 2.5× magnification). At high power (8× magnification), the exit pupil of the telescopic sight has an exit pupil that is about 4 mm in diameter (i.e., 32 mm diameter objective lens divided by 8× magnification) and centered on the optical axis of the telescopic sight. Accordingly, the top of the exit pupil is about 8 mm below the bottom of the viewing zone of the optic (i.e., (10 mm separation between the bottom of the viewing zone and the optical axis of the telescopic sight)−0.5× (4 mm telescopic sight exit pupil diameter at 8× magnification). Consequently, the exit pupil and the viewing zone are spaced apart from one another within a common viewing plane at the eyepoint, but are separated by a smaller dead zone than conventionally mounted reflex-on-telescopic sights, so that a user would be expected to use less vertical head movement when shifting between sights.

It will be obvious to those having skill in the art that many changes may be made to the details of the above-described embodiments without departing from the underlying principles of the invention. The scope of the present invention should, therefore, be determined only by the following claims.

The invention claimed is:

1. A combination optical aiming device for viewing differently magnified images of a distant object from a common viewing plane, the combination optical aiming device comprising:
   an erector system;
   a non-magnifying sight having an optic for viewing an image of an aiming point superimposed on a field of view of the non-magnifying sight from a viewing zone located within a common viewing plane; and
   a magnifying sight having an objective for gathering light from the distant object and an eye lens for viewing a magnified image of the distant object at an eyepoint also located in the common viewing plane, the optic and the eye lens being positioned relative to one another so that a horizontal plane that is both tangent to a base of the optic and parallel to an optical axis of the objective intersects a reference circle that surrounds the eye lens, touches at least one edge of the eye lens, and is centered about an optical axis of the eye lens, and the optic is positioned predominately outside of a projection of a perimeter of the eye lens, the projection being parallel to the optical axis of the objective.

2. The combination optical aiming device of claim 1, wherein the eyepoint and the viewing zone are spaced apart from one another within the common viewing plane.

3. The combination optical aiming device of claim 1, wherein the non-magnifying sight includes a reflex sight, and the aiming point is generated by an aiming light source included in the combination optical aiming device.

4. The combination optical aiming device of claim 1, wherein the magnifying and non-magnifying sights are positioned so that respective aiming lines-of-sight for the sights are substantially parallel with one another.

5. The combination optical aiming device of claim 1, wherein the magnifying sight includes a truncated objective lens.

6. The combination optical aiming device of claim 1, wherein the eye lens and the optic have complementary shapes.

7. The combination optical aiming device of claim 1, wherein the eye lens has a truncated circular shape formed by removal of a circular segment from the reference circle, the circular segment having a shape defined by intersection of the horizontal plane with the reference circle.

8. The combination optical aiming device of claim 1, further comprising:
   a common housing; and
   a sealing window used to form a weathertight environment within the housing.

9. The combination optical aiming device of claim 8, wherein light received from the distant object by both the non-magnifying sight and the magnifying sight passes through the sealing window en route to the common viewing plane.

10. The combination optical aiming device of claim 8, wherein the eye lens and the optic are positioned between the object and a flat, optically transmissive surface of the sealing window so that the sealing window forms a unified viewing interface for the non-magnifying and magnifying sights.

11. The combination optical aiming device of claim 8, wherein the eye lens is formed using a pair of planoconvex lenses that sandwich an eye lens region of the sealing window.

12. A combination optical aiming device for viewing differently magnified images of a distant object from a common viewing plane, the combination optical aiming device comprising:
   an erector system;
   a non-magnifying sight having a truncated optic for viewing an image of an aiming point superimposed on a non-magnified image of a distant object from a viewing zone in a common viewing plane; and
   a magnifying sight having an objective for gathering light from the distant object and having a truncated eye lens for viewing a magnified image of the distant object at an eyepoint located in the common viewing plane, the truncated optic and the truncated eye lens being positioned relative to one another so as to position the truncated optic predominately outside of a projection of a perimeter of the truncated eye lens, the projection being parallel to an optical axis of the objective.

13. The combination optical aiming device of claim 12, wherein the truncated optic and the truncated eye lens are positioned so that a horizontal plane that is both tangent to a base of the truncated optic and parallel to an optical axis of the objective intersects a reference circle that surrounds the truncated eye lens, touches at least one edge of the truncated eye lens, and is centered about an optical axis of the truncated eye lens.

14. The combination optical aiming device of claim 13, wherein the eyepoint and the viewing zone are spaced apart from one another within the common viewing plane.

15. The combination optical aiming device of claim 12, wherein the non-magnifying sight includes a reflex sight, and the aiming point is generated by an aiming light source included in the combination optical aiming device.

16. The combination optical aiming device of claim 12, wherein the magnifying and non-magnifying sights are positioned so that respective aiming lines-of-sight for the sights are substantially parallel with one another.

17. The combination optical aiming device of claim 12, wherein the magnifying sight includes a truncated objective lens.

18. The combination optical aiming device of claim 12, wherein the truncated eye lens and the truncated optic have complementary shapes.

19. The combination optical aiming device of claim 12, wherein the truncated eye lens has a truncated circular shape defined by removal of a circular segment from a circular lens, and the truncated optic has a truncated circular shape defined by removal of a circular segment from a circular mirror.

20. The combination optical aiming device of claim 12, further comprising:
   a common housing; and
   a sealing window used to form a weathertight environment within the housing.

21. The combination optical aiming device of claim 20, wherein light received from the distant object by both the non-magnifying sight and the magnifying sight passes through the sealing window en route to the common viewing plane.

22. The combination optical aiming device of claim 20, wherein the truncated eye lens and the truncated optic are positioned between the object and a flat, optically transmissive surface of the sealing window so that the sealing window forms a unified viewing interface for the non-magnifying and magnifying sights.

23. The combination optical aiming device of claim 20, wherein the truncated eye lens is formed using a pair of planoconvex lenses that sandwich an eye lens region of the sealing window.

24. A method of manufacturing a combination optical aiming device for viewing differently magnified images of a distant object from a common viewing plane, the method comprising:
   fabricating an optic for a non-magnifying sight;
   fabricating an erector system, an objective, and an eye lens for a magnifying sight; and
   mounting the optic, the objective and the eye lens so that a horizontal plane that is both tangent to a base of the optic and parallel to an optical axis of the objective intersects a reference circle that surrounds the eye lens, touches at least one edge of the eye lens, and is centered about an optical axis of the eye lens so as to position the optic predominately outside of a projection of a perimeter of the eye lens, the projection being parallel to the optical axis of the objective.

25. The method of claim 24, further comprising:
   mounting the non-magnifying and magnifying sights within a common housing;
   forming a weathertight environment within the housing using a common sealing window through which optical axes of both the non-magnifying and magnifying sights pass en route to the common viewing plane.

26. The method of claim 24, wherein fabricating the eye lens includes optically bonding a pair of planoconvex lenses on either side of an eye lens region of the sealing window.

\* \* \* \* \*